US010045051B2

(12) United States Patent
Sun et al.

(10) Patent No.: US 10,045,051 B2
(45) Date of Patent: Aug. 7, 2018

(54) METHOD AND APPARATUS FOR ASSESSING VIDEO QUALITY

(71) Applicant: HUAWEI TECHNOLOGIES CO., LTD., Shenzhen, Guangdong (CN)

(72) Inventors: Lina Sun, Shenzhen (CN); Shan Gao, Shenzhen (CN); Fuzheng Yang, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 716 days.

(21) Appl. No.: 14/539,423

(22) Filed: Nov. 12, 2014

(65) Prior Publication Data

US 2015/0071363 A1    Mar. 12, 2015

Related U.S. Application Data

(63) Continuation of application No. PCT/CN2012/086822, filed on Dec. 18, 2012.

(30) Foreign Application Priority Data

May 22, 2012  (CN) .......................... 2012 1 0159635

(51) Int. Cl.
*H04N 19/86* (2014.01)
*H04N 19/85* (2014.01)
(Continued)

(52) U.S. Cl.
CPC ........... *H04N 19/85* (2014.11); *H04N 19/124* (2014.11); *H04N 19/154* (2014.11); *H04N 17/004* (2013.01)

(58) Field of Classification Search
CPC .... H04N 19/85; H04N 19/124; H04N 19/154; H04N 17/004
See application file for complete search history.

(56) References Cited

U.S. PATENT DOCUMENTS 5,623,424 A * 4/1997 Azadegan ............ G11B 27/031
                                                 375/E7.088
6,011,868 A * 1/2000 van den Branden .... H04N 7/52
                                                  348/E17.003
(Continued)

FOREIGN PATENT DOCUMENTS

CN           101094409        12/2007
CN           101534448         9/2009
(Continued)

OTHER PUBLICATIONS

ITU-T, "Series H: Audiovisual and Multimedia Systems Infrastructure of audiovisual services—Coding of moving video", Jan. 2012.*
(Continued)

*Primary Examiner* — Sath V Perungavoor
*Assistant Examiner* — Philip Dang
(74) *Attorney, Agent, or Firm* — Staas & Halsey LLP (57) ABSTRACT

Embodiments of the present invention provide a method and an apparatus for assessing video quality. The method includes: determining an actual quantization parameter and a critical quantization parameter of the target video according to a target video, where the critical quantization parameter is a maximum quantization parameter of the target video in a case in which a distortion is not evidently identifiable by human eyes; and determining quality of the target video according to the actual quantization parameter and the critical quantization parameter. According to the method and apparatus of the present invention, a critical quantization parameter of a target video is determined, and the actual quantization parameter is compared with the critical quantization parameter, which can accurately determine whether subjective quality of the target video changes strictly monotonically relative to the used actual quantization parameter, so that the video quality can be assessed accurately.

6 Claims, 2 Drawing Sheets

(51) Int. Cl.
*H04N 19/124* (2014.01)
*H04N 19/154* (2014.01)
*H04N 17/00* (2006.01)

(56) References Cited

U.S. PATENT DOCUMENTS

| | | | | |
|---|---|---|---|---|
| 7,349,474 B2* | 3/2008 | Bagni | ............... | G06T 9/005 |
| | | | | 375/240.15 |
| 7,372,903 B1* | 5/2008 | Lee | ............... | H04N 19/172 |
| | | | | 375/240 |
| 7,839,312 B2* | 11/2010 | Tanaka | ............... | H03M 7/4006 |
| | | | | 341/107 |
| 7,995,649 B2* | 8/2011 | Zuo | ............... | H04N 19/176 |
| | | | | 375/240.01 |
| 8,165,204 B2* | 4/2012 | Bronstein | ............... | H04N 19/61 |
| | | | | 375/240.03 |
| 2004/0114685 A1 | 6/2004 | Kouloheris et al. | | |
| 2004/0156559 A1* | 8/2004 | Cheng | ............... | H04N 19/527 |
| | | | | 382/286 |
| 2005/0259623 A1* | 11/2005 | Garudadri | ............... | H04L 29/06 |
| | | | | 370/335 |
| 2006/0018559 A1* | 1/2006 | Kim | ............... | H04N 19/122 |
| | | | | 382/251 |
| 2006/0165304 A1* | 7/2006 | Lee | ............... | H04N 19/187 |
| | | | | 382/240 |
| 2006/0224762 A1* | 10/2006 | Tian | ............... | H04N 21/2187 |
| | | | | 709/231 |
| 2007/0002946 A1* | 1/2007 | Bouton | ............... | H04N 19/15 |
| | | | | 375/240.01 |
| 2007/0237223 A1 | 10/2007 | Lee | | |
| 2007/0248164 A1* | 10/2007 | Zuo | ............... | H04N 19/176 |
| | | | | 375/240.2 |
| 2007/0258519 A1* | 11/2007 | Srinivasan | ............... | H04N 19/176 |
| | | | | 375/240.03 |
| 2008/0025400 A1 | 1/2008 | Sugimoto et al. | | |
| 2008/0165861 A1* | 7/2008 | Wen | ............... | H04N 19/139 |
| | | | | 375/240.26 |
| 2008/0317111 A1 | 12/2008 | Davis | | |
| 2009/0074058 A1 | 3/2009 | Zhang et al. | | |
| 2009/0086816 A1* | 4/2009 | Leontaris | ............... | H04N 19/80 |
| | | | | 375/240.03 |
| 2009/0180536 A1* | 7/2009 | Shimofure | ............... | H03M 7/4006 |
| | | | | 375/240.03 |
| 2009/0232203 A1* | 9/2009 | Jayant | ............... | H04N 19/115 |
| | | | | 375/240.02 |
| 2009/0268981 A1* | 10/2009 | Lu | ............... | G06T 7/41 |
| | | | | 382/275 |
| 2009/0324113 A1* | 12/2009 | Lu | ............... | H04N 19/147 |
| | | | | 382/234 |
| 2010/0008241 A1 | 1/2010 | Gustafsson et al. | | |
| 2010/0061446 A1* | 3/2010 | Hands | ............... | H04N 19/196 |
| | | | | 375/240.02 |
| 2010/0074338 A1* | 3/2010 | Yamori | ............... | H04N 19/139 |
| | | | | 375/240.16 |
| 2011/0013694 A1 | 1/2011 | Watanabe et al. | | |
| 2011/0058605 A1 | 3/2011 | Ma | | |
| 2011/0085605 A1 | 4/2011 | Xie et al. | | |
| 2011/0090960 A1* | 4/2011 | Leontaris | ............... | H04N 19/103 |
| | | | | 375/240.12 |
| 2011/0096839 A1* | 4/2011 | Gomila | ............... | H04N 19/102 |
| | | | | 375/240.16 |
| 2011/0170608 A1* | 7/2011 | Shi | ............... | H04N 19/147 |
| | | | | 375/240.24 |
| 2011/0249073 A1* | 10/2011 | Cranfill | ............... | H04N 7/147 |
| | | | | 348/14.02 |
| 2011/0249086 A1* | 10/2011 | Guo | ............... | H04N 7/147 |
| | | | | 348/14.12 |
| 2011/0292997 A1* | 12/2011 | An | ............... | H04N 19/521 |
| | | | | 375/240.03 |
| 2011/0311147 A1* | 12/2011 | Pahalawatta | ............... | G06T 7/0002 |
| | | | | 382/197 |
| 2012/0020415 A1* | 1/2012 | Yang | ............... | H04N 17/004 |
| | | | | 375/240.27 |
| 2012/0075436 A1* | 3/2012 | Chen | ............... | H04N 19/597 |
| | | | | 348/51 |
| 2014/0232878 A1 | 8/2014 | Sun et al. | | |

FOREIGN PATENT DOCUMENTS

| | | |
|---|---|---|
| CN | 101635846 | 1/2010 |
| CN | 101778275 | 7/2010 |
| CN | 101356827 | 2/2011 |
| CN | 101978700 | 2/2011 |
| CN | 101998137 | 3/2011 |
| CN | 102257831 | 11/2011 |
| EP | 2296379 | 3/2011 |
| WO | 2009/007133 A2 | 1/2009 |
| WO | 2010/093745 A1 | 8/2010 |

OTHER PUBLICATIONS

Extended European Search Report dated Mar. 19, 2015 in corresponding European Patent Application No. 12877137.5.

A. G. Davis et al., "Hybrid no-reference video quality prediction", Broadband Multimedia Systems and Broadcasting, 2009. BMSB '09. IEEE International Symposium on, IEEE, Piscataway, NJ, USA, May 13, 2009, pp. 1-6.

Christian Keimel et al., "No-Reference Video Quality Metric for HDTV Based on H.264/AVC Bitstream Features", Image Processing (ICIP), 2011 18th IEEE International Conference on, IEEE, Sep. 11, 2011, pp. 3325-3328.

Keishiro Watanabe et al., "Proposal of new QoE assessment approach for quality management of IPTV services", 15th IEEE International Conference on Image Processing: ICIP 2008; San Diego, California, USA Oct. 12-15, 2008, IEEE, Piscataway, NJ, USA, Oct. 12, 2008, pp. 2060-2063.

Chinese Office Action dated Oct. 30, 2014 in corresponding Chinese Patent Application No. 201210159635.7.

Chinese Search Report dated Oct. 22, 2014 in corresponding Chinese Patent Application No. 2012101596357.

International Search Report dated Mar. 28, 2013 in corresponding International Patent Application No. PCT/CN2012/086822.

International Search Report dated Mar. 28, 2013, in corresponding International Patent Application No. PCT/CN2012/086822.

* cited by examiner

100

Determine an actual quantization parameter and a critical quantization parameter of the target video according to a target video, where the critical quantization parameter is a maximum quantization parameter of the target video in a case in which a distortion is evidently identifiable by human eyes — S110

Determine quality of the target video according to the actual quantization parameter and the critical quantization parameter — S120

METHOD AND APPARATUS FOR ASSESSING VIDEO QUALITY

CROSS-REFERENCE TO RELATED APPLICATIONS

This application is a continuation of International Application No. PCT/CN2012/086822, filed on Dec. 18, 2012, which claims priority to Chinese Patent Application No. 201210159635.7, filed on May 22, 2012, both of which are hereby incorporated by reference in their entireties.

TECHNICAL FIELD

Embodiments of the present invention relate to the video field, and in particular, to a method and an apparatus for assessing video quality.

BACKGROUND

Under a background of rapid development of network videos, because of large data volumes, a high real-time requirement, and high user sensitivity of a video service, an operator needs to assess quality of a transmitted video service so as to ensure user experience of the video service.

Currently, a known method for assessing video quality regards that an approximate linear relationship exists between subjective quality of a video and a quantization parameter of the video, that is, different quantization parameters are corresponding to different subjective quality, and therefore the subjective quality of the video is calculated according to a quantization parameter used by the video (during encoding).

However, it is found through an experiment that the relationship between the subjective quality of a video and the quantization parameter used by the video is not completely linear, and that the subjective quality of a video does not change strictly monotonically relative to the quantization parameter. Therefore, the foregoing existing method for assessing video quality cannot assess video quality accurately.

SUMMARY

Embodiments of the present invention provide a method and an apparatus for assessing video quality, which can assess video quality accurately.

According to one aspect, a method for assessing video quality is provided, where the method includes: determining an actual quantization parameter and a critical quantization parameter of the target video according to a target video, where the critical quantization parameter is a maximum quantization parameter of the target video in a case in which a distortion is not evidently identifiable by human eyes; and determining quality of the target video according to the actual quantization parameter and the critical quantization parameter.

According to another aspect, an apparatus for assessing video quality is provided, where the apparatus includes: a parameter determining unit, configured to determine an actual quantization parameter and a critical quantization parameter of the target video according to a target video, where the critical quantization parameter is a maximum quantization parameter of the target video in a case in which a distortion is not evidently identifiable by human eyes; and a quality assessing unit, configured to determine quality of the target video according to the actual quantization parameter and the critical quantization parameter that are determined by the parameter determining unit.

According to the method and apparatus for assessing video quality in the embodiments of the present invention, a critical quantization parameter of a target video is determined, and a actual quantization parameter is compared with the critical quantization parameter, which can accurately determine whether subjective quality of the target video changes strictly monotonically relative to the used actual quantization parameter, so that the video quality can be assessed accurately.

BRIEF DESCRIPTION OF DRAWINGS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
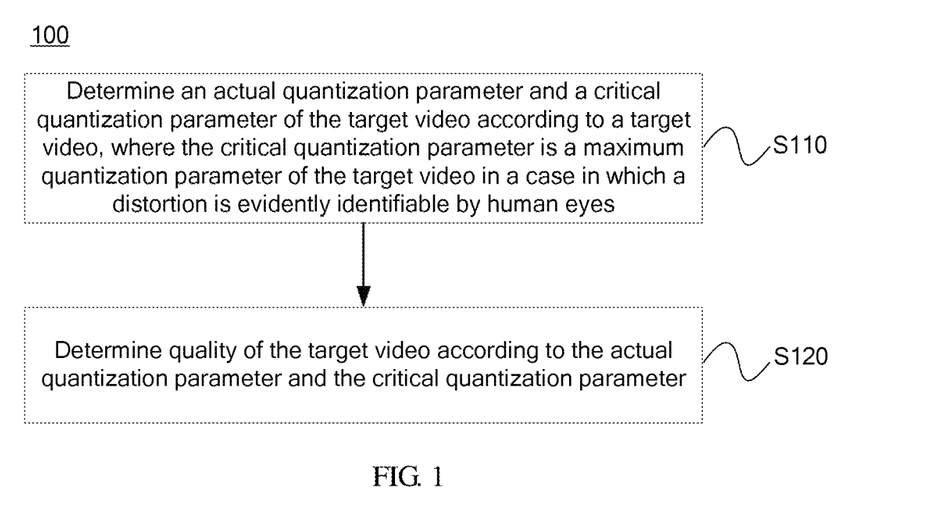
FIG. 1 is a schematic flowchart of a method for assessing video quality according to an embodiment of the present invention.

FIG. 1 shows a schematic flowchart of a method 100 for assessing video quality according to an embodiment of the present invention. As shown in FIG. 1, the method includes:

S110. Determine an actual quantization parameter and a critical quantization parameter of the target video according to a target video, where the critical quantization parameter is a maximum quantization parameter of the target video in a case in which a distortion is not evidently identifiable by human eyes.

S120. Determine quality of the target video according to the actual quantization parameter and the critical quantization parameter.

Figure 2:
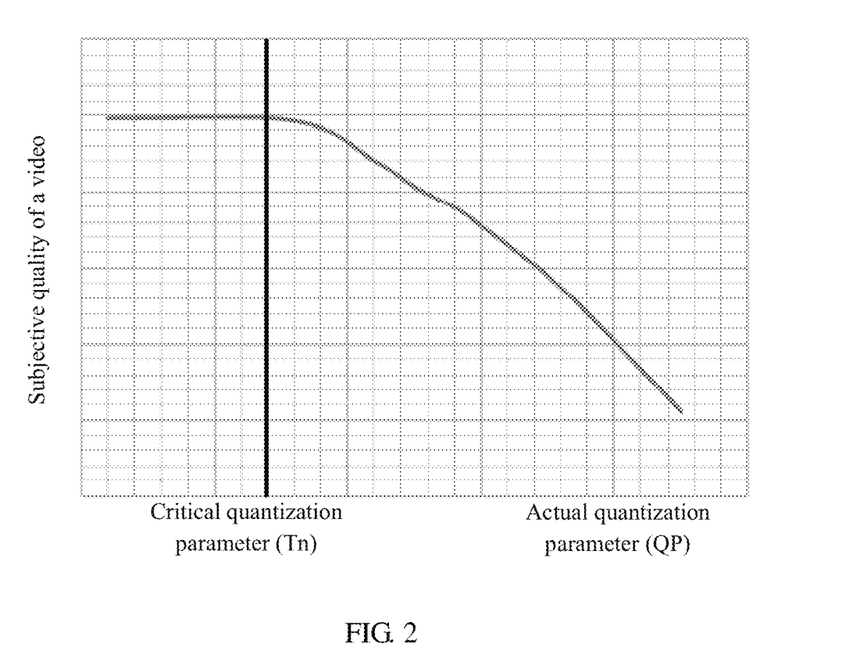
FIG. 2 is a curve diagram used to represent a result of an experiment for measuring a relationship between subjective quality and a quantization parameter of a video.

Specifically, first, a subjective experiment is conducted for measuring a relationship between subjective quality of a video and a quantization parameter used by the video during encoding, that is, video sequences of different content types are encoded by using different quantization parameters (QP) (for example, for the H.264 encoding type, QP0-51 is used for encoding; and for the MPEG4 or MPEG2 encoding type, QP0-31 is used for encoding), and then subjective scoring is performed on quality of each encoded video sequence. It should be noted that a specific definition of the QP described in the present application may be different in different encoding types, which may be a specific quantization step or be an index (index) value corresponding to a quantization step. FIG. 2 shows a relationship between an average value of subject quality scores of different types of video sequences (the vertical axis) and a QP used during encoding. As shown in FIG. 2, when the QP is relatively small, a distortion is normally not evidently identifiable by human eyes within a certain range (a range from the origin in the figure to $T_a$). In addition, a changing trend of the subjective quality is that, as the QP increases, the distortion is more and more evident to human eyes. However, in a QP change process, there is a QP critical point for human eyes in identifying a distortion. When the QP is smaller than the critical point, the distortion is basically unidentifiable by human eyes, that is, it may be considered that the subjective quality is equivalent to a no-compression distortion. However, when the QP is greater than the critical point, the video quality deteriorates as the QP increases, that is, the video quality changes strictly monotonically relative to the QP.

Therefore, in the present invention, it is found based on the foregoing experiment that, when subjective quality of a target video is to be determined, a critical quantization parameter of the target video is first determined, and the subjective quality of the target video is determined according to a relationship between an actual quantization parameter actually used during actual encoding of the target video and a critical point.

That is, in S110, the actual quantization parameter used during encoding of the target video is obtained from a received data packet of the target video. In addition, the critical quantization parameter of the target video may be determined according to, for example, a encoding type and a resolution of the target video.

The following describes a process of determining the critical quantization parameter of the video.

In this embodiment of the present invention, the determining an actual quantization parameter and a critical quantization parameter of the target video according to a target video includes:

determining, according to the target video, a reference quantization parameter corresponding to the target video and content complexity information of the target video; and determining the critical quantization parameter according to the reference quantization parameter and the content complexity information.

Specifically, a reference quantization parameter (denoted by $T_0$) is set uniformly for all target videos, that is, when content of the videos is not considered, it is considered that videos with a same video encoding type and a same resolution have a uniform critical point $T_0$.

In addition, in this embodiment of the present invention, the $T_0$ may be obtained by using the following subjective experiment, that is, as an example rather than a limitation, video sequences with a low video space complexity and a low time complexity (without video content being considered) are selected according to the encoding type and the resolution, the video sequences are encoded by using different QPs, and subjective scoring is performed on the video sequences, so as to find a QP with which subjective quality begins to deteriorate as the $T_0$. In addition, a table entry indicating a relationship between the encoding type and resolution of the video and the reference quantization parameter ($T_0$)) may be generated. In this way, when quality assessment is performed on the target video, the reference quantization parameter ($T_0$) of the target video may be determined from the table entry according to the encoding type and resolution of the target video. It should be understood that the foregoing method for determining a reference quantization parameter is merely an exemplary description of the present invention and the present invention is not limited thereto.

In general cases, for a video sequence with a high content complexity cc (the content complexity of a video is used to represent a video encoding complexity and is a uniform descriptor combining a time complexity and a space complexity of the video, which includes a space complexity and/or a time complexity), a human eye masking effect is relatively strong. Therefore, a value of a quantization parameter critical point of a video with a higher cc is greater than a value of a quantization parameter critical point of a video with a lower cc.

That is, when an impact of the complexity of the video content is considered, because the masking of human eye vision is stronger when the complexity is higher, the critical quantization parameter (denoted by $T_n$) is also larger.

Therefore, in this embodiment of the present invention, content complexity information of the target video may also be obtained, where the content complexity information may be carried in a video stream of the target video, so that the complexity information can be extracted from the target video; and the content complexity information may also be calculated according to the actual quantization parameter, a bit rate, and the like of the target video. In addition, in this embodiment of the present invention, the method for calculating a video complexity is the same as that in the prior art, which is not further described herein. Furthermore, content complexity information of video sources of different content (for example, the video sources may be classified into news videos, sports videos, and movie videos) may be measured by means of experiments and the like, and a table entry indicating a correspondence between video content and content complexity information is generated, so that the content complexity information can be determined according to the content of the target video. It should be understood that the foregoing method for determining content complexity information is merely an example of the present invention and the present invention is not limited thereto.

Therefore, the determining the critical quantization parameter according to the reference quantization parameter and the content complexity information includes:

determining the critical quantization parameter according to the following formula:

$$T_n = T_0 \cdot \left[1 + \left(\frac{scc}{a_1}\right)^{b_1}\right] \cdot \left[1 + \left(\frac{tcc}{a_2}\right)^{b_2}\right]; \text{ or}$$

$$T_n = T_0 \cdot \left[1 + \left(\frac{scc}{a_1}\right)^{b_1}\right]; \text{ or}$$

$$T_n = T_0 \cdot \left[1 + \left(\frac{tcc}{a_2}\right)^{b_2}\right]; \text{ or}$$

$$T_n = T_0 \cdot [a_1 \cdot scc + b_1 \cdot tcc + c_1]; \text{ or}$$

$$T_n = T_0 \cdot \left[1 + \frac{\left(\frac{scc}{a_1}\right)^{b_1} \cdot \left(\frac{tcc}{a_2}\right)^{b_2}}{1 + \left(\frac{scc}{a_1}\right)^{b_1} \cdot \left(\frac{tcc}{a_2}\right)^{b_2}}\right]; \text{ or}$$

$$T_n = T_0 \cdot \left[1 + \frac{\left(\frac{scc}{a_1}\right)^{b_1}}{1 + \left(\frac{scc}{a_1}\right)^{b_1}}\right]; \text{ or}$$

-continued $$T_n = T_0 \cdot \left[ 1 + \frac{\left(\frac{tcc}{a_2}\right)^{b_2}}{1 + \left(\frac{tcc}{a_2}\right)^{b_2}} \right]$$

where $T_n$ is the critical quantization parameter, $T_0$ is the reference quantization parameter, scc is the space complexity information, tcc is the time complexity information, and $a_1$, $b_1$, $a_2$, $b_2$, and $c_1$ are constants obtained by training according to sample videos.

Specifically, the $T_n$ is equivalent to a result of adding content complexity masking on the basis of the $T_0$. Therefore, the $T_n$ may be expressed by using $T_0$ and the complexity according to the following formula 1.

$$T_n = T_0 \cdot \text{func}(cc) \qquad \text{formula 1}$$

where $T_0$ is a constant and represents the reference quantization parameter. As is described above, a plurality of numeric values may be pre-obtained according to the video encoding type and the resolution, and which value is used is determined according to the video encoding type and resolution of the target video; and func (cc) is a content complexity masking formula. In addition, in this embodiment of the present invention, the content complexity cc may include a space complexity scc and a time complexity tcc, or may include only a space complexity or a time complexity. Therefore, the content complexity information includes at least one of the time complexity information and the space complexity information of the target video.

In addition, when the cc increases, the func (cc) increases. This formula may be a linear model or be a non-linear model or be a combination of a linear model and a non-linear model.

Therefore, as an example rather than a limitation, the func (cc) may be expressed by the following formulas 2 to 8:

$$\text{func}(scc, tcc) = \left[1 + \left(\frac{scc}{a_1}\right)^{b_1}\right] \cdot \left[1 + \left(\frac{tcc}{a_2}\right)^{b_2}\right] \qquad \text{formula 2}$$

$$\text{func}(scc) = \left[1 + \left(\frac{scc}{a_1}\right)^{b_1}\right] \qquad \text{formula 3}$$

$$\text{func}(tcc) = \left[1 + \left(\frac{tcc}{a_2}\right)^{b_2}\right] \qquad \text{formula 4}$$

$$\text{func}(scc, tcc) = [a_1 \cdot scc + b_1 \cdot tcc + c_1] \qquad \text{formula 5}$$

$$\text{func}(scc, tcc) = \left[1 + \frac{\left(\frac{scc}{a_1}\right)^{b_1} \cdot \left(\frac{tcc}{a_2}\right)^{b_2}}{1 + \left(\frac{scc}{a_1}\right)^{b_1} \cdot \left(\frac{tcc}{a_2}\right)^{b_2}}\right] \qquad \text{formula 6}$$

$$\text{func}(scc) = \left[1 + \frac{\left(\frac{scc}{a_1}\right)^{b_1}}{1 + \left(\frac{scc}{a_1}\right)^{b_1}}\right] \qquad \text{formula 7}$$

$$\text{func}(tcc) = \left[1 + \frac{\left(\frac{tcc}{a_2}\right)^{b_2}}{1 + \left(\frac{tcc}{a_2}\right)^{b_2}}\right] \qquad \text{formula 8}$$

where a1, b1, a2, b2, and c1 are constants and may be obtained by training in the following manner, that is, a subjective quality test or like experiment is conducted on a plurality of videos of different content according to the video encoding type and the resolution, and the $T_n$, $T_0$, scc, and tcc of each video are recorded as training data. In this way, an expectation maximization algorithm, for example, may be used to gradually improve parameters of the formulas, so that a likelihood probability of the parameters and the training data is increased gradually and finally ended at an extremely high point. Understood intuitively, the expectation maximization algorithm may also be considered as a successive approximation algorithm: parameters of a model are unknown previously and a set of parameters may be selected at random or an initial parameter λ0 is roughly defined in advance; a most likely state corresponding to the set of parameters is determined, and a probability of possible results of each training sample is calculated; in a current state, the parameters are corrected by using samples and the parameter λ is re-estimated, and a state of the model is re-determined according to the new parameter; and in this way, through a plurality of iterations, the process continues in a circular manner until a convergence condition is met, so that the parameters of the model gradually approximate to real parameters. Therefore, this step may be automatically performed in an offline manner. It should be understood that all formulas described above and the training methods for the constants in all the formulas are merely an embodiment of the present invention and the present invention is not limited thereto.

In this embodiment of the present invention, by resolving the video encoding type, resolution, actual quantization parameter, and content complexity information of the target video, parameters required by the method for assessing video quality according to this embodiment of the present invention can be obtained, without the need to resolve the target video deeply, for example, without the need to resolve a specific pixel value or motion vector. In this way, a requirement for terminal performance can be reduced.

In addition, by determining the critical quantization parameter of the target video according to the content complexity information of the target video, a final quality assessment structure can better fit subjective feelings of human eyes.

In S120, subjective quality of the target video may be assessed according to the actual quantization parameter and the critical quantization parameter that are obtained through the foregoing steps. That is, the determining quality of the target video according to the actual quantization parameter and the critical quantization parameter includes:

when the actual quantization parameter is smaller than or equal to the critical quantization parameter, determining that the quality of the target video is highest quality; and when the actual quantization parameter is greater than the critical quantization parameter, determining the quality of the target video according to the following formula:

$$Q_{encoding} = Q_{max} - a_3 \cdot (QP - T_n); \text{ or}$$

$$Q_{encoding} = Q_{max} - a_3 \cdot (QP - T_n)^2 + b_3$$

where $Q_{encoding}$ is the quality of the target video, $Q_{max}$ is the specified highest quality of the target video, QP is the actual quantization parameter of the target video, $T_n$ is the critical quantization parameter, and $a_3$ and $b_3$ are constants obtained by training according to sample videos.

Specifically, in this embodiment of the present invention, videos may be classified according to, for example, encoding types and resolutions of the videos, and highest quality values $Q_{max}$ in a case of no compression are pre-defined for video types with different encoding types and resolutions.

In this way, when the actual quantization parameter QP used by the target video is smaller than or equal to the critical quantization parameter $T_n$ of the target video calculated through the foregoing steps, it may be considered that human eyes do not identify a distortion of the target video. Therefore, it may be considered that the subjective quality of the target video is the highest quality $Q_{max}$ of a video type to which the target video belongs.

When the actual quantization parameter QP used by the target video is greater than the critical quantization parameter $T_n$ of the target video calculated through the foregoing steps, the distortion of the target video increases as the QP increases. In addition, the relationship between the distortion of the target video and the $T_n$ and QP may be linear, or be non-linear, or be a combination of a linear formula and a non-linear formula. Therefore, the distortion may be expressed by using the QP and the $T_n$ according to the following formula 9 or formula 10:

$$\text{func}(QP, T) = a_3 \cdot (QP - T_n) \qquad \text{formula 9}$$

$$\text{func}(QP, T) = a_3 \cdot (QP - T_n)^2 + b_3 \qquad \text{formula 10}$$

where $a_3$ and $b_3$ are constants and may be obtained by training in the following manner, that is, a subjective quality test or like experiment is conducted on a plurality of videos of different content according to the video encoding type and the resolution, and the quality (distortion), $T_n$, and QP of each video are recorded as training data. In this way, an expectation maximization algorithm, for example, may be used to gradually improve parameters of the formulas, so that a likelihood probability of the parameters and the training data is increased gradually and finally ended at an extremely large point. Understood intuitively, the expectation maximization algorithm may also be considered as a successive approximation algorithm: parameters of a model are unknown previously and a set of parameters may be selected at random or an initial parameter $\lambda 0$ is roughly defined in advance; a most likely state corresponding to the set of parameters is determined, and a probability of possible results of each training sample is calculated; in a current state, the parameters are corrected by using samples and the parameter $\lambda$ is re-estimated, and a state of the model is re-determined according to the new parameter; and in this way, through a plurality of iterations, the process continues until a convergence condition is met, so that the parameters of the model gradually approximate to real parameters. Therefore, this step may be automatically performed in an offline manner. It should be understood that all formulas described above and the training methods for the constants in all the formulas are merely an embodiment of the present invention and the present invention is not limited thereto.

In this way, the subjective quality of the target video may be calculated according to the highest quality $Q_{max}$ of the target video and the distortion value calculated according to formula 9 or formula 10.

In the method for assessing video quality according to the embodiment of the present invention, a critical quantization parameter of a target video is determined, and an actual quantization parameter is compared with the critical quantization parameter, which can accurately determine whether subjective quality of the target video changes strictly monotonically relative to the used actual quantization parameter, so that the video quality can be assessed accurately.

Optionally, in this embodiment of the present invention, the determining an actual quantization parameter and a critical quantization parameter of the target video according to a target video includes:

determining an actual quantization parameter and a critical quantization parameter of each frame, each strip or each macroblock of the target video according to the target video; and the determining the quality of the target video according to the actual quantization parameter and the critical quantization parameter includes:

determining quality of each frame, each strip or each macroblock according to the actual quantization parameter and critical quantization parameter of each frame, each strip or each macroblock; and determining the quality of the video according to the quality of each frame, each strip or each macroblock.

Specifically, the foregoing process may be calculation of video sequence quality based on an average QP value of video sequences or video segments or based on the QP and $T_n$ of each frame, each strip or each macroblock of the video (frames, strips or macroblocks have different content complexity information, and their $T_n$ values also vary, and a method for calculating the $T_n$ of each frame, each strip or each macroblock is similar to the foregoing method for calculating the $T_n$ of the target video, which is not described herein.). Quality values of the frames, strips or macroblocks are first calculated, and then an average value or a weighted average value is calculated for the quality values of the frames, strips or macroblocks, so as to determine the quality of the entire video sequence.

For calculation of quality of a video frame, the quality of the video frame may be directly calculated based on a QP of the video frame; or quality values of strips are calculated based on QPs of the strips of the video and then combined as the quality of the frame is synthesized, or a QP of the frame is obtained by using a combination manner such as an average value and a weighted average value of QPs of the strips, so as to calculate the quality of the frame; or quality values of macroblocks are calculated based on QPs of the macroblocks of the video and then combined as the quality of the frame, or a QP of the frame is obtained by using a combination manner such as an average value and a weighted average value of QPs of the macroblocks, so as to calculate the quality of the frame.

It should be noted that, for different frame types, for example, I frame, P frame, and B frame, subjective quality of videos encoded by using a same QP may be different. In this case, quality of different frame types may be changed by adjusting parameter values $a_3$ and $b_3$ in formula 9 or formula 10.

After quality of each video frame in the video stream is obtained or average quality of a plurality of video frames with an approximate QP is obtained by using the foregoing method for calculating frame quality, quality of a video sequence may be obtained by combining quality values of single frames or quality values of a frame combination of multiple frames according to multiple existing methods.

In addition, in this embodiment of the present invention, the subjective quality of the target video calculated through the foregoing steps may further be corrected according to a frame rate of the target video. That is, with an influence of the frame rate considered, when the frame rate is lower, a video sequence may be incoherent, which causes poorer video compression reference quality. A specific correcting method is the same as that in the prior art, which is not described herein.

It should be noted that network video quality is affected by many complicated factors, for example, a parameter at a video encoding/decoding end and adaptability of a transmission channel, and bandwidth, packet loss, delay, jitter and like quality of service of the transmission channel have different influences on the subjective quality of the video. Subjective experience of no matter packet loss or pause is a quality drop value with other distortions added to the experience of a compression distortion. Therefore, in this embodiment of the present invention, the quality of the video is assessed in a case in which the bandwidth, packet loss, delay, and jitter are not considered. In addition, on the basis of a finally obtained assessment result, the assessment result may further be corrected according to a condition of the bandwidth, packet loss, delay, and jitter.

In the foregoing, the method for assessing video quality according to the embodiment of the present invention has been described in detail with reference to FIG. 1 and FIG. 2. The following describes, with reference to FIG. 3, an apparatus for assessing video quality according to an embodiment of the present invention in detail.

Figure 3:
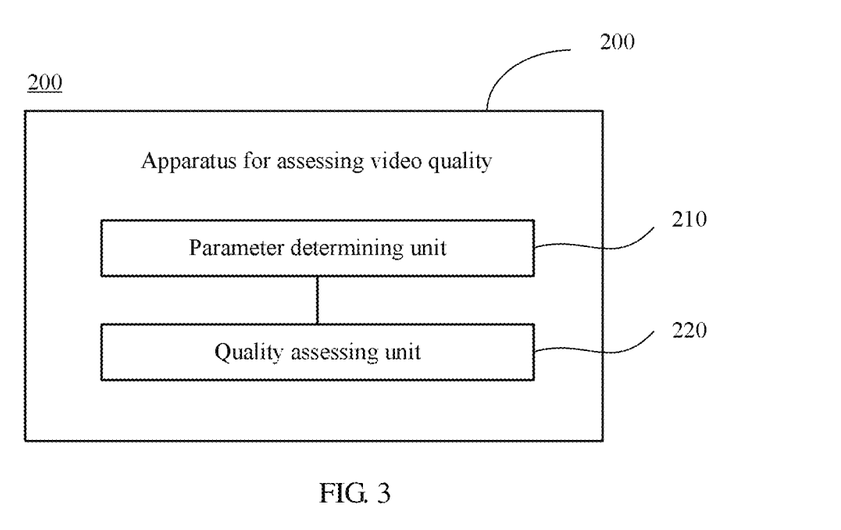
FIG. 3 is a schematic block diagram of an apparatus for assessing video quality according to an embodiment of the present invention.

FIG. 3 is a schematic block diagram of an apparatus 200 for assessing video quality according to an embodiment of the present invention. As shown in FIG. 3, the apparatus may include:

a parameter determining unit 210, configured to determine an actual quantization parameter and a critical quantization parameter of the target video according to a target video, where the critical quantization parameter is a maximum quantization parameter of the target video in a case in which a distortion is not evidently identifiable by human eyes; and a quality assessing unit 220, configured to determine quality of the target video according to the actual quantization parameter and the critical quantization parameter that are determined by the parameter determining unit 210.

In addition, in this embodiment of the present invention, the parameter determining unit 210 is specifically configured to determine, according to the target video, a reference quantization parameter corresponding to the target video and content complexity information of the target video; and determine the critical quantization parameter according to the reference quantization parameter and the content complexity information.

In addition, in this embodiment of the present invention, the content complexity information includes at least one of time complexity information and space complexity information of the target video.

Optionally, the parameter determining unit 210 is specifically configured to determine the critical quantization parameter according to the following formula:

$$T_n = T_0 \cdot \left[1 + \left(\frac{scc}{a_1}\right)^{b_1}\right] \cdot \left[1 + \left(\frac{tcc}{a_2}\right)^{b_2}\right];$$

$$T_n = T_0 \cdot \left[1 + \left(\frac{scc}{a_1}\right)^{b_1}\right];$$

$$T_n = T_0 \cdot \left[1 + \left(\frac{tcc}{a_2}\right)^{b_2}\right];$$

$$T_n = T_0 \cdot [a_1 \cdot scc + b_1 \cdot tcc + c_1];$$

$$T_n = T_0 \cdot \left[1 + \frac{\left(\frac{scc}{a_1}\right)^{b_1} \cdot \left(\frac{tcc}{a_2}\right)^{b_2}}{1 + \left(\frac{scc}{a_1}\right)^{b_1} \cdot \left(\frac{tcc}{a_2}\right)^{b_2}}\right];$$

$$T_n = T_0 \cdot \left[1 + \frac{\left(\frac{scc}{a_1}\right)^{b_1}}{1 + \left(\frac{scc}{a_1}\right)^{b_1}}\right]; \text{ or}$$

$$T_n = T_0 \cdot \left[1 + \frac{\left(\frac{tcc}{a_2}\right)^{b_2}}{1 + \left(\frac{tcc}{a_2}\right)^{b_2}}\right]$$

where $T_n$ is the critical quantization parameter, $T_0$ is the reference quantization parameter, scc is the space complexity information, tcc is the time complexity information, and $a_1$, $b_1$, $a_2$, $b_2$, and $c_1$ are constants obtained by training according to sample videos.

In this embodiment of the present invention, the quality assessing unit 220 is specifically configured to, when the actual quantization parameter is smaller than or equal to the critical quantization parameter, determine that the quality of the target video is highest quality; and configured to determine the quality of the target video according to the following formula when the actual quantization parameter is greater than the critical quantization parameter:

$$Q_{encoding} = Q_{max} - a_3 \cdot (QP - T_n); \text{ or}$$

$$Q_{encoding} = Q_{max} - a_3 \cdot (QP - T_n)^2 + b_3$$

where $Q_{encoding}$ is the quality of the target video, $Q_{max}$ is the specified highest quality of the target video, QP is the actual quantization parameter of the target video, $T_n$ is the critical quantization parameter, and $a_3$ and $b_3$ are constants obtained by training according to sample videos.

Optionally, in this embodiment of the present invention, the parameter determining unit 210 is specifically configured to determine an actual quantization parameter and a critical quantization parameter of each frame, each strip or each macroblock of the target video; and the quality assessing unit 220 is specifically configured to determine quality of each frame, each strip or each macroblock according to the actual quantization parameter and critical quantization parameter that are of each frame, each strip or each macroblock and are determined by the parameter determining unit 210; and determine the quality of the video according to the quality of each frame, each strip or each macroblock.

The apparatus for assessing video quality according to this embodiment of the present invention may correspond to an execution subject of the method for assessing video quality according to the embodiments of the present invention. In addition, the modules in the apparatus for controlling service transmission and the foregoing other operations and/or functions implement the corresponding procedure of the method 100 shown in FIG. 1, which are not further described herein for brevity.

According to the apparatus for assessing video quality in this embodiment of the present invention, a critical quantization parameter of a target video is determined, and a actual quantization parameter is compared with the critical quantization parameter, which can accurately determine whether subjective quality of the target video changes strictly monotonically relative to the used actual quantization parameter, so that the video quality can be assessed accurately.

In addition, by resolving a video encoding type, a resolution, the actual quantization parameter, and the content complexity information of the target video, parameters required by the method for assessing video quality according to the embodiment of the present invention can be obtained, without the need to resolve the target video deeply, for example, without the need to resolve a specific pixel value or a motion vector. In this way, a requirement for terminal performance can be reduced.

In addition, the critical quantization parameter of the target video is determined according to the content complexity information of the target video, so that a final quality assessment structure can better fit subjective feelings of human eyes.

It should be noted that network video quality is affected by many complicated factors, for example, a parameter at a video encoding/decoding end and adaptability of a transmission channel, and bandwidth, packet loss, delay, jitter and like quality of service of the transmission channel have different influences on the subjective quality of the video of no matter packet loss or pause is a quality drop value with other distortions added to the experience of a compression distortion. Therefore, in this embodiment of the present invention, the quality of the video is assessed in a case in which the bandwidth, packet loss, delay, and jitter are not considered. In addition, on the basis of a finally obtained assessment result, the assessment result may further be corrected according to a condition of the bandwidth, packet loss, delay, and jitter.

The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in the various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and units, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the division of unit is merely a division of logical functions and there may be other divisions in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

What is claimed is:

1. A method for assessing video quality, comprising:
determining, according to a target video, an actual quantization parameter and a critical quantization parameter of the target video, wherein the critical quantization parameter is a maximum quantization parameter of the target video when the actual quantization parameter is smaller than the critical quantization parameter; and
determining quality of the target video according to the actual quantization parameter and the critical quantization parameter,
wherein the determining, according to the target video, the critical quantization parameter of the target video comprises:
determining, according to the target video, a reference quantization parameter corresponding to the target video and content complexity information of the target video; and
determining the critical quantization parameter according to the following formula:

$$T_n = T_0 \cdot \left[1 + \left(\frac{scc}{a_1}\right)^{b_1}\right] \cdot \left[1 + \left(\frac{tcc}{a_2}\right)^{b_2}\right];$$

$$T_n = T_0 \cdot \left[1 + \left(\frac{scc}{a_1}\right)^{b_1}\right];$$

$$T_n = T_0 \cdot \left[1 + \left(\frac{tcc}{a_2}\right)^{b_2}\right];$$

$$T_n = T_0 \cdot [a_1 \cdot scc + b_1 \cdot tcc + c_1];$$

$$T_n = T_0 \cdot \left[1 + \frac{\left(\frac{scc}{a_1}\right)^{b_1} \cdot \left(\frac{tcc}{a_2}\right)^{b_2}}{1 + \left(\frac{scc}{a_1}\right)^{b_1} \cdot \left(\frac{tcc}{a_2}\right)^{b_2}}\right];$$

$$T_n = T_0 \cdot \left[1 + \frac{\left(\frac{scc}{a_1}\right)^{b_1}}{1 + \left(\frac{scc}{a_1}\right)^{b_1}}\right]; \text{ or}$$

$$T_n = T_0 \cdot \left[1 + \frac{\left(\frac{tcc}{a_2}\right)^{b_2}}{1 + \left(\frac{tcc}{a_2}\right)^{b_2}}\right]$$

wherein $T_n$ is the critical quantization parameter, $T_0$ is the reference quantization parameter, scc is a space complexity information, tcc is a time complexity information, and $a_1$, $b_1$, $a_2$, $b_2$, and $c_1$ are constants obtained by training according to sample videos.

2. The method according to claim 1 wherein the determining quality of the target video according to the actual quantization parameter and the critical quantization parameter comprises:
when the actual quantization parameter is smaller than or equal to the critical quantization parameter, determining that the quality of the target video is highest quality; and
when the actual quantization parameter is greater than the critical quantization parameter, determining the quality of the target video according to the following formula:

$$Q_{encoding} = Q_{max} - a_3 \cdot (QP - T_n); \text{ or}$$

$$Q_{encoding} = Q_{max} - a_3 \cdot (QP - T_n)^2 + b_3$$

wherein $Q_{encoding}$ is the quality of the target video, $Q_{max}$ is the specified highest quality of the target video, QP is the actual quantization parameter of the target video, $T_n$ is the critical quantization parameter, and $a_3$ and $b_3$ are constants obtained by training according to sample videos.

3. The method according to claim 1, wherein the determining, according to the target video, the actual quantization parameter and the critical quantization parameter of the target video comprises:
determining an actual quantization parameter and a critical quantization parameter of each frame, each strip or each macroblock of the target video according to the target video; and
the determining quality of the target video according to the actual quantization parameter and the critical quantization parameter comprises:
determining quality of each frame, each strip or each macroblock according to the actual quantization parameter and critical quantization parameter of each frame, each strip or each macroblock; and
determining the quality of the video according to the quality of each frame, each strip or each macroblock.

4. An apparatus for assessing video quality, comprising:
electronic hardware configured to:
determine, according to a target video, an actual quantization parameter and a critical quantization parameter of the target video, wherein the critical quantization parameter is a maximum quantization parameter that is usable of the target video when the actual quantization parameter is smaller than the critical quantization parameter;
determine quality of the target video according to the actual quantization parameter and the critical quantization parameter;
determine, according to the target video, a reference quantization parameter corresponding to the target video and content complexity information of the target video; and
determine the critical quantization parameter according to the following formula:

$$T_n = T_0 \cdot \left[1 + \left(\frac{scc}{a_1}\right)^{b_1}\right] \cdot \left[1 + \left(\frac{tcc}{a_2}\right)^{b_2}\right];$$

-continued $$T_n = T_0 \cdot \left[1 + \left(\frac{scc}{a_1}\right)^{b_1}\right];$$

$$T_n = T_0 \cdot \left[1 + \left(\frac{tcc}{a_2}\right)^{b_2}\right];$$

$$T_n = T_0 \cdot [a_1 \cdot scc + b_1 \cdot tcc + c_1];$$

$$T_n = T_0 \cdot \left[1 + \frac{\left(\frac{scc}{a_1}\right)^{b_1} \cdot \left(\frac{tcc}{a_2}\right)^{b_2}}{1 + \left(\frac{scc}{a_1}\right)^{b_1} \cdot \left(\frac{tcc}{a_2}\right)^{b_2}}\right];$$

$$T_n = T_0 \cdot \left[1 + \frac{\left(\frac{scc}{a_1}\right)^{b_1}}{1 + \left(\frac{scc}{a_1}\right)^{b_1}}\right]; \text{ or}$$

$$T_n = T_0 \cdot \left[1 + \frac{\left(\frac{tcc}{a_2}\right)^{b_2}}{1 + \left(\frac{tcc}{a_2}\right)^{b_2}}\right]$$

wherein $T_n$ is the critical quantization parameter, $T_0$ is the reference quantization parameter, scc is the space complexity information, tcc is the time complexity information, and $a_1$, $b_1$, $a_2$, $b_2$, and $c_1$ are constants obtained by training according to sample videos.

5. The apparatus according to claim 4, wherein the at least one processor is further configured to:
when the actual quantization parameter is smaller than or equal to the critical quantization parameter, determine that the quality of the target video is highest quality; and
determine the quality of the target video according to the following formula when the actual quantization parameter is greater than the critical quantization parameter:

$$Q_{encoding} = Q_{max} - a_3 \cdot (QP - T_n); \text{ or}$$

$$Q_{encoding} = Q_{max} - a_3 \cdot (QP - T_n)^2 + b_3$$

wherein $Q_{encoding}$ is the quality of the target video, $Q_{max}$ is the specified highest quality of the target video, QP is the actual quantization parameter of the target video, $T_n$ is the critical quantization parameter, and $a_3$ and $b_3$ are constants obtained by training according to sample videos.

6. The apparatus according to claim 4, wherein the at least one processor is further configured to:
determine an actual quantization parameter and a critical quantization parameter of each frame, each strip or each macroblock of the target video according to the target video;
determine quality of each frame, each strip or each macroblock according to the actual quantization parameter and critical quantization parameter that are of each frame, each strip or each macroblock; and
determine the quality of the video according to the quality of each frame, each strip or each macroblock.

* * * * *